June 27, 1961  R. E. LAMBERT ET AL  2,990,438
METHODS OF AND TANK FURNACES FOR MAKING GLASS
Original Filed July 7, 1945  2 Sheets-Sheet 1
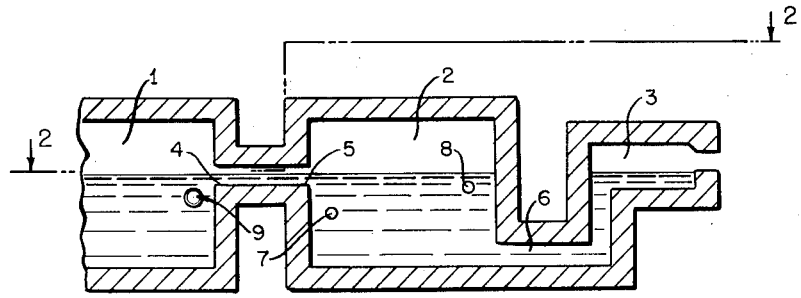
FIG. I
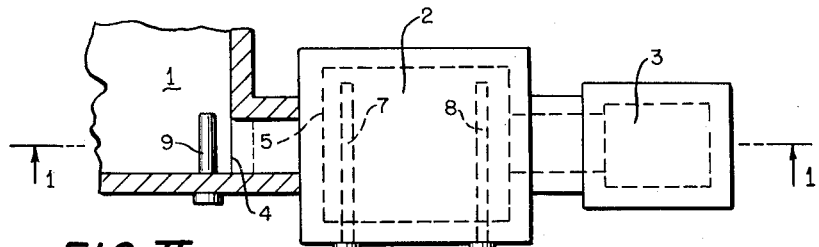
FIG. II
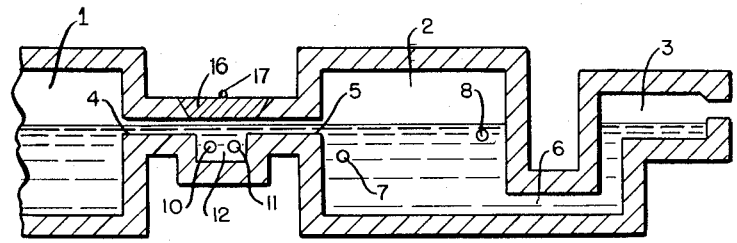
FIG. III
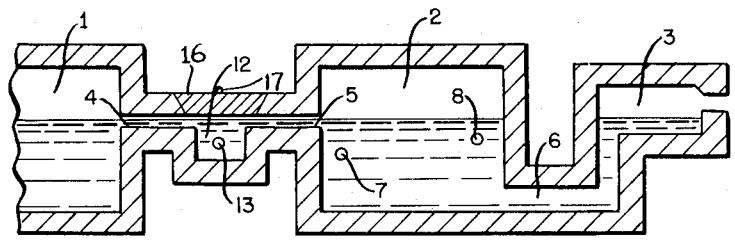
FIG. IV
INVENTORS
ROGER EMILE LAMBERT
PIERRE ARBEIT
BY
ATTORNEYS

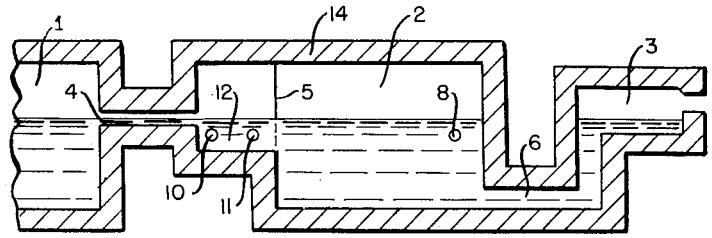
FIG. V
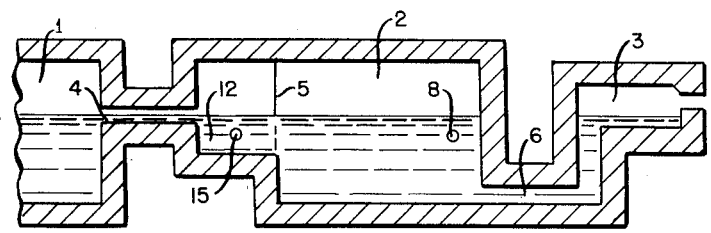
FIG. VI
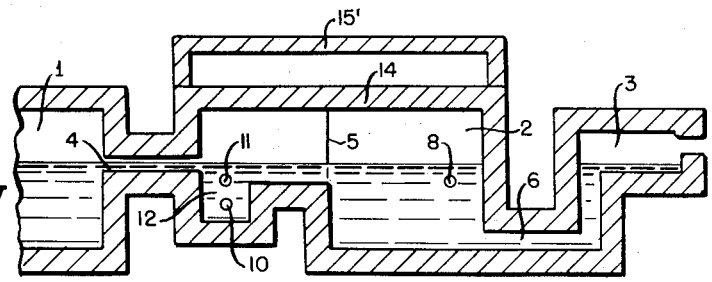
FIG. VII
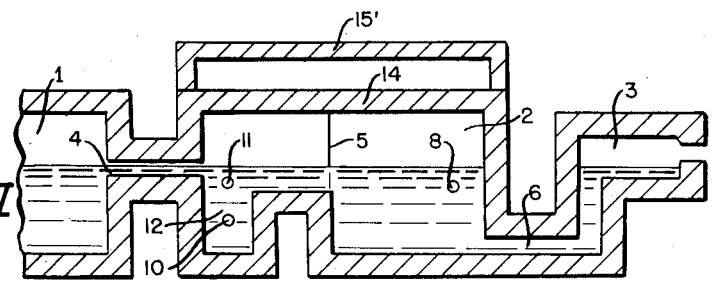
FIG. VIII
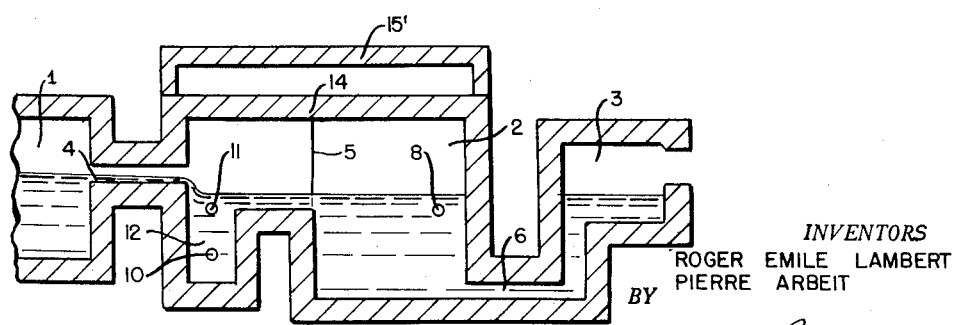
FIG. IX
INVENTORS
ROGER EMILE LAMBERT
PIERRE ARBEIT

United States Patent Office 2,990,438
Patented June 27, 1961

2,990,438
METHODS OF AND TANK FURNACES FOR MAKING GLASS
Roger Emile Lambert and Pierre Arbeit, Paris, France, assignors to Compagnie de Saint-Gobain, Paris, France
Original application July 7, 1945, Ser. No. 603,728. Divided and this application Dec. 9, 1954, Ser. No. 474,127
Claims priority, application France Apr. 13, 1944
14 Claims. (Cl. 13—6)

The present invention relates to the manufacture of glass.

This case is a division of application Ser. No. 603,728, filed July 7, 1945, which has an effective filing date of April 13, 1944, the filing date of the corresponding French patent application Ser. No. 41,521. Such French application has matured into French Patent No. 55,739, issued May 21, 1952, published Sept. 4, 1952.

It refers more particularly to the process described in our co-pending application for "Methods of and Tank Furnaces for Making Glass," Ser. No. 603,725, filed July 7, 1945 by Roger Emile Lambert where the fining of the glass is effected under certain conditions in a compartment distinct from the compartment where the glass making materials are melted. In such process, the glass whilst still full of bubbles is flowed in a unidirectional shallow stream from the batch melting compartment to the surface of a fining and cooling and settling compartment, and in the fining, cooling and settling compartment the upper portion of the glass, including the glass so transferred, is rapidly heated to fining temperature by causing an electric current to flow across the fining compartment in the said upper portion of the glass, which glass when fined is allowed to settle into the cooling and settling part of the compartment and is then withdrawn from the lower portion of the compartment into a working compartment, whereby unfined glass is prevented from reaching the working compartment.

In said process, at the same time as the glass is brought to a temperature favorable for the escape of bubbles, it lies at the surface, or near the surface of the bath, so that for those two reasons, the glass is rapidly freed from bubbles.

Such process enables the operator to completely and rapidly fine the melted glass, which may issue from the melting compartment when only just melted, and which consequently may be produced in that melting compartment by heating at comparatively low temperature, thus achieving a particular fuel economy.

Our present invention, which constitutes an improvement in the hereabove mentioned process, affords among other advantages, the possibility to still further decrease, without any inconvenience, the temperature in the melting compartment, and to produce the glass with still better economy.

However, we ascertained that if, when penetrating into the fining compartment, the glass is at too low a temperature, its density may be higher, in spite of the bubbles it contains, than the density of the hot glass which is being refined at the upper part of the fining compartment. Under those conditions, the glass coming into said fining compartment would immediately go down to the lower part of said compartment, instead of remaining at the upper part until refined, and such glass might thus pass directly to the subsequent working compartment, without being refined.

The method according to the present invention consists in heating the glass while it passes from the melting compartment to the fining compartment. By thus heating the glass in the interval between the melting compartment and the fining compartment, it is possible— while maintaining the melting compartment at a temperature which is lower than the temperature required for the glass at its entrance into the upper portion of the fining compartment—to bring the glass entering said fining compartment to the temperature required for a good fining operation.

The effect of the invention is to render the temperature of the glass entering the fining compartment independent of the temperature of the glass coming out of the melting compartment, and it decreases the temperature of the melting compartment which no longer need be limited by the conditions required for a good fining operation. By thus maintaining the great bulk of glass found in the melting compartment at a low temperature, and by raising only the temperature of the small quantity of glass transferred as it is transferred, a notable fuel economy is secured.

We ascertained that the fuel economy obtained in the melting compartment as a result of this temperature decrease is more important than the additional expense of energy necessary for the heating of the glass between the melting compartment and the fining compartment.

Several embodiments of the invention are hereunder described merely as examples.

In said examples, the additional heating between the melting compartment, and the fining compartment is obtained by the passage of an electric current through the glass. Such heating means affords the advantage of localizing the additional heat in the portion of the glass situated between the outlet of the melting compartment and the inlet of the fining compartment, and of controlling in the most economical way the temperature of the glass flowing into the fining compartment. It must be understood that, without departing from the invention, any other heating means may be used, for instance heating by gas or by liquid fuels directly acting on the glass inside the channel connecting the melting compartment to the fining compartment or indirectly acting on the glass by heating the exterior walls of said channel. It is also possible to use gas or other fuel heating, in combination with heating obtained by the passage of an electric current through the glass, and embodiments of this type are also illustrated.

FIGS. I and II show, the former a vertical longitudinal section and the latter a plan view of a first embodiment of the invention.

FIGS. III, and IV, are vertical longitudinal sections of another embodiment of the invention showing modifications of electrode arrangements.

FIGS. V and VI show another embodiment in vertical longitudinal section with modifications of electrode arrangement.

FIG. VII shows a further modification in vertical longitudinal section.

FIGS. VIII and IX are further modifications.

In all drawings, 1 designates the melting compartment, 2 the fining and cooling compartment, 3 the working compartment, 4—5 the shallow channel leading from the melting compartment to the fining and cooling compartment at its upper level, the inlet of this connecting channel being designated by 4 and its outlet by 5. 6 designates the duct siutated at the bottom of the fining compartment through which the fined glass passes into the compartment 3.

The melting compartment is heated by any desired means, for instance by flames; such means is not represented on the drawing. In the case of the embodiment shown in FIG. I and II, the heating of the fining compartment is obtained by the passage of an electric current flowing between the two electrodes 7 and 8 placed at the upper part of the bath in compartment 2.

In FIGS. I and II the additional heating which is the object of our invention is obtained by means of an electrode 9 located in the melting compartment, near the inlet 4 of the channel. The polarity of such electrode is chosen in relation to the polarity of electrode 7 so that the electric current passes between the two electrodes 7 and 9. This provides a hot body 9 at the inlet port 4 of the channel and a hot body 7 at the place of discharge of port 5 of the channel. The current passing between these electrodes heats the glass situated between these electrodes and especially the glass in the channel 4—5. The glass layer in the channel 4—5 being shallow, the major part of the energy developed by the additional current circulating between 7 and 9 is produced in this layer itself, and the quantity of glass affected being relatively small between electrodes 7—9, a relatively rapid heating of the glass in the channel occurs and a convenient raising of the temperature of the glass entering into the fining compartment is secured. It is thus possible to avoid, to a practically sufficient extent, heating the mass of glass in the melting compartment beyond that necessary for simple melting before it reaches the inlet 4 of the channel, and to prevent circulating convection currents to the other parts of the melting compartment and uselessly dispersing in said compartment the calories developed by the current between electrodes 7—9.

Such inconvenience will be all the more easily avoided by providing an electrode 9 with a rather large diameter, so that the resistance of the glass to the passage of the current will be small in the neighborhood of the electrode, as between the electrode and the inlet of the channel 4.

In the example shown in FIG. III, where the fining compartment is heated by electrodes 7—8, the additional heating is obtained by the electrodes 10—11, located on the very path of the glass between the outlet of the melting compartment and the inlet of the fining compartment, i.e. between 4 and 5. In the case of electrodes 10—11 of the represented type (horizontal cylindrical bars), it is often necessary to provide, for such electrodes, a recess 12 in the channel 4—5 which is deeper than the portions 4 and 5. The equipment shown in FIG. III affords the advantage of strictly avoiding any dissipation of the additional heat in the melting compartment 1.

The major part of the additional heating may be developed between electrodes 10 and 11, i.e. in the recess 12, or between 11 and 7, toward the outlet of channel 4—5.

The presence of the recess 12 permits (and this is one of the characteristics of the present invention) adding ingredients to the glass in that recess, i.e. at a time when the glass is no longer in the melting compartment and not yet in the fining compartment. The addition of ingredients to recess 12 may be accomplished by the provision of a removable lid 16 in the upper wall or roof of recess 12, such lid being removable by lifting means (not shown) which engages lifting eye 17 on the lid. We ascertained that advantages are obtained in the output, owing to such arrangement, ingredients being added neither in the melting compartment nor in the fining compartment. Such additions may be of very different kinds, for example coloring materials, products for activating the fining, and substances able to modify the basic composition of the glass coming from the melting compartment.

In the embodiment shown in FIG. IV, a similar recess 12 is interposed in the canal 4—5, but in such recess only one electrode, designated 13, is located, exchanging electric current with the electrodes 7—8 of the fining compartment and being consequently able to heat the glass between them by Joule effect.

FIG. V shows another embodiment, in which the additional heating is obtained as in the example of FIG. III, by means of two electrodes 10 and 11 but the deepened part of the channel 4—5 is extended so that the section of the glass will not be decreased between the electrode 11 and the electrodes of the fining compartment. In that case, electrode 11 may play the same part as electrode 7 of FIG. III, i.e. that of an electrode exchanging an important amount of current with electrode 8, and consequently the electrode 7 may be suppressed as shown in FIG. V. It may be seen from that figure that the recess 12, opening towards the fining compartment, constitutes a kind of intermediate step between the shallow channel 4 and the fining zone 2. The crown of such fining compartment may itself be prolonged over said step as shown on FIG. V, instead of being stopped at the plumb line of channel 5 at the inlet of the fining compartment.

FIG. VI, concerning an embodiment analogous to the preceding one, also shows a recess 12 forming a step which is deeper than channel 4, but only one electrode 15 is situated on that step instead of the two electrodes 10 and 11 of FIG. V, which ensures both the additional heating before the entrance of the glass to the fining compartment, and the heating of said compartment by the current which passes towards the electrode 8. This is an especially simple embodiment of the invention.

In the embodiment shown in FIG. VII, the recess 12, wherein are placed the electrodes 10 and 11 for the additional heating, is sufficiently deep to enable one to place those electrodes one above the other. This arrangement is very efficient for carrying out the process when the glass coming from the melting compartment is at particularly low temperature and has a tendency to go down when pouring into the hotter glass of recess 12; it engages the electrode 10 at the lower part of said recess and is rapidly heated thereby and stirred by the vertical convection movement created by the electrodes 10—11. In the same way as in FIGS. V and VI, channel 4—5 may be sufficiently deep at its deepened part to pass an important current from the electrode 11 through the glass of the fining compartment 2 to electrode 8, so that it is possible to have only one electrode in that compartment, as shown on FIG. VII.

It must be understood that said vertical recess 12 might be of any depth, and particularly it may be as deep as the fining compartment, as shown in FIG. VIII. The crown 14 of the fining compartment is itself prolonged over the recess 12 as in FIG. VI. As an example, a second crown 15' is added to protect the crown 14 from heat losses. In the examples thus far described, the melting compartment communicates with the fining compartment through a shallow channel at the surface of the glass bath. However, in a structure such as that of FIG. IX, communication may also take place through an overflow dam which may be subject to conformation of the channel and arrangement of the electrodes similar to those described above. This feature is indicated in FIG. 9 by showing a lower surface level of the glass in the fining and working compartments 2 and 3 than in the melting compartment 1.

What is claimed is:

1. Tank furnace for the manufacture of glass comprising a melting compartment, a fining compartment, a shallow channel leading from the surface of the glass in the melting compartment to the fining compartment, a submerged electrode in the fining compartment disposed to heat the upper portion of the glass in the fining compartment, the channel being provided, between the inlet and the outlet, with a recess deeper than the inlet and outlet portions of said channel, two cooperating electrodes supplying electric current to the glass and located one above the other in said recess, a working compartment and a duct connecting the lower portion of the fining and working compartments.

2. Tank furnace for the manufacture of glass comprising a melting compartment, a fining compartment, a shallow channel leading the glass from the melting compartment directly to the surface of the fining compartment, a submerged electrode in the fining compartment disposed to heat the upper portion of the glass in the fining compartment, the channel being provided, between the inlet and the outlet, with a recess deeper than the inlet and outlet portions of said channel, two cooperating electrodes supplying electric current to the glass and located in said recess, a working compartment, and a duct connecting the lower portion of the fining and working compartments.

3. Tank furnace for the manufacture of glass comprising a melting compartment, a fining compartment, a shallow channel leading the glass from the melting compartment directly to the surface of the fining compartment, a submerged electrode in the fining compartment disposed to heat the upper portion of the glass in the fining compartment, the channel being provided, between the inlet and the outlet, with a recess deeper than the inlet and outlet portions of said channel, and two cooperating electrodes supplying electric current to the glass and located in said recess.

4. Tank furnace for the manufacture of glass comprising a melting compartment, a fining compartment, a shallow channel leading the glass from the melting compartment directly to the surface of the fining compartment, a submerged electrode in the fining compartment disposed to heat the upper portion of the glass in the fining compartment, the channel being provided, between the inlet and the outlet, with a recess deeper than the inlet and outlet portions of said channel, and a heating electrode extending into the glass in the recess.

5. Tank furnace for the manufacture of glass comprising a melting compartment containing a pool of crude glass, a fining compartment containing a pool of glass being fined, the level of the glass in the fining pool being appreciably lower than the level of the glass in the melting pool, a shallow channel leading from the surface of the glass in the melting compartment to the uppermost layers of the glass in the fining compartment, a submerged electrode in the fining compartment disposed to heat the upper portion of the glass in the fining compartment, the channel being provided, between the inlet and the outlet, with a recess deeper than the inlet and outlet portions of the channel, and means for heating glass in at least a portion of the channel.

6. Tank furnace for the manufacture of glass comprising a melting compartment, a fining compartment, a shallow channel leading from the surface of the glass in the melting compartment to the fining compartment, a submerged electrode in the fining compartment disposed to heat the upper portion of the glass in the fining compartment, the channel being provided with a recess deeper than the inlet and outlet portions of said channel, two cooperating electrodes supplying electric current to the glass and located one above the other in said recess, a working compartment and a duct connecting the lower portion of the fining and working compartments.

7. Tank furnace for the manufacture of glass comprising a melting compartment, a fining compartment, a shallow channel leading the glass from the melting compartment directly to the surface of the fining compartment, a submerged electrode in the fining compartment disposed to heat the upper portion of the glass in the fining compartment, the channel being provided with a recess deeper than the inlet and outlet portions of said channel, two cooperating electrodes supplying electric current to the glass and located in said recess, a working compartment and a duct connecting the lower portion of the fining and working compartments.

8. Tank furnace for the manufacture of glass comprising a melting compartment, a fining compartment, a yellow channel leading from the surface of the glass in the melting compartment to the fining compartment, a submerged electrode in the fining compartment disposed to heat the upper portion of the glass in the fining compartment, the channel being provided with a recess deeper than the inlet and outlet portions of said channel, and two cooperating electrodes supplying electric current to the glass and located one above the other in said recess.

9. Tank furnace for the manufacture of glass comprising a melting compartment, a fining compartment, a shallow channel leading the glass from the melting compartment directly to the surface of the fining compartment, a submerged electrode in the fining compartment disposed to heat the upper portion of the glass in the fining compartment, the channel being provided with a recess deeper than the inlet and outlet portions of said channel, and a heating electrode extending into the glass in said recess, a working compartment, and a duct connecting the lower portion of the fining and working compartments.

10. Method of making glass in a tank type furnace, which comprises making a pool of crude glass containing bubbles, establishing a separate smaller pool of glass, flowing the crude glass while still containing bubbles in a unidirectional shallow stream from the crude glass pool to said separate pool, the first contact of the said stream with the glass in the said separate pool being with the upper levels of the glass in said separate pool, heating said crude glass containing bubbles in said unidirectional shallow stream during its flow from the crude glass pool to the said separate pool to a temperature sufficient to enable the crude glass containing bubbles entering the separate pool to remain in the upper layers of the said separate pool, further heating the glass in the top of said separate pool to a temperature sufficient to fine the crude glass containing bubbles by passing Joule effect current of fining intensity through the top of the separate pool only, leaving the lower portion of said separate pool at lower temperatures and drawing glass from the lower portion of said separate pool and the fined glass from the top of the said separate pool downward through the Joule effect current in the top thereof into said lower portion at a rate which completes the fining before the effect of said Joule effect current is lost.

11. The method as claimed in claim 10 wherein the heating of the glass in said shallow stream is produced by Joule effect.

12. Method of making glass in a tank type furnace, which comprises making a pool of crude glass containing bubbles, establishing a separate smaller pool of glass, flowing the crude glass while still containing bubbles in a unidirectional shallow stream from the crude glass pool to said separate pool, the first contact of the said stream with the glass in the said separate pool being with the upper levels of the glass in said separate pool, heating said crude glass containing bubbles in said unidirectional shallow stream during its flow from the crude glass pool to the said separate pool so that no substantial fining occurs in the stream and that the crude glass containing bubbles entering the other pool is enabled to remain in the upper layers of the said separate pool, further heating the glass in the top of said separate pool to a temperature sufficient to fine the crude glass containing bubbles by passing Joule effect current of fining intensity through the top of the separate pool only, leaving the lower portion of said separate pool at lower temperatures and drawing glass from the lower portion of said separate pool and the fined glass from the top of the said separate pool downward through the Joule effect current in the top thereof into said lower portion at a rate which completes the fining before the effect of said Joule effect current is lost.

13. The method of claim 10 in which a source of heat is established in the glass at the place where the glass of said stream leaves the melting pool to form said stream, and another source of heat is established in the glass at the place where the glass of said stream enters the fining pool.

14. The method of claim 13 in which the said sources of heat are of electrode type acting to heat the glass by Joule effect.

(References on following page)

References Cited in the file of this patent

UNITED STATES PATENTS

| | | |
|---|---|---|
| 698,980 | Luhne | Apr. 29, 1902 |
| 704,993 | Weber | July 15, 1902 |
| 776,771 | Richardson | Aug. 2, 1904 |
| 789,911 | Hitchcock | May 16, 1905 |
| 972,778 | Sauvageon | Oct. 11, 1910 |
| 1,186,076 | Chambers | June 6, 1916 |
| 1,552,555 | Grauel | Sept. 8, 1925 |
| 1,593,054 | Arbeit | July 20, 1926 |
| 1,594,496 | Clark | Aug. 3, 1926 |
| 1,611,328 | Arbogast | Dec. 21, 1926 |
| 1,759,228 | Drake | May 20, 1930 |
| 1,815,978 | Hitner | July 28, 1931 |
| 1,880,541 | Wadman | Oct. 4, 1932 |
| 1,906,695 | Lufkin | May 2, 1933 |
| 1,944,855 | Wadman | Jan. 23, 1934 |
| 1,953,023 | Mulholland | Mar. 27, 1934 |
| 1,970,112 | Wadman | Aug. 14, 1934 |
| 2,081,595 | McIntosh | May 25, 1937 |
| 2,119,949 | Blau et al. | June 7, 1938 |
| 2,254,079 | McAlpine | Aug. 26, 1941 |
| 2,274,643 | Adams | Mar. 3, 1942 |
| 2,274,986 | Kilian et al. | Mar. 3, 1942 |
| 2,293,948 | Peyches | Aug. 25, 1942 |
| 2,294,373 | Batchell | Sept. 1, 1942 |
| 2,313,217 | Borel | Mar. 9, 1943 |
| 2,331,946 | Von Pazsicyky | Oct. 19, 1943 |
| 2,397,852 | Gentil | Apr. 2, 1946 |
| 2,490,339 | De Voe | Dec. 6, 1949 |
| 2,512,761 | Arbeit | June 27, 1950 |
| 2,658,095 | Arbeit et al. | Nov. 3, 1953 |
| 2,707,717 | Seymour | May 3, 1955 |

FOREIGN PATENTS

| | | |
|---|---|---|
| 250,536 | Great Britain | July 29, 1926 |
| 262,535 | Great Britain | Dec. 16, 1926 |
| 611,401 | Great Britain | Oct. 28, 1948 |